United States Patent
Panje et al.

(10) Patent No.: US 8,826,346 B1
(45) Date of Patent: Sep. 2, 2014

(54) METHODS OF IMPLEMENTING TRICKPLAY

(71) Applicant: General Instrument Corporation, Horsham, PA (US)

(72) Inventors: Kishna Prasad Panje, Bangalore (IN); William P Franks, San Diego, CA (US); Murali Sahasranaman, Bangalore (IN)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 13/832,191

(22) Filed: Mar. 15, 2013

(51) Int. Cl.
| | |
|---|---|
| *H04N 7/173* | (2011.01) |
| *H04N 5/783* | (2006.01) |
| *H04N 21/472* | (2011.01) |
| *H04N 5/44* | (2011.01) |
| *H04N 5/781* | (2006.01) |
| *G11B 27/00* | (2006.01) |
| *H04N 9/804* | (2006.01) |
| *H04N 21/432* | (2011.01) |
| *H04N 5/85* | (2006.01) |

(52) U.S. Cl.
CPC ..... *H04N 7/17318* (2013.01); *H04N 21/47202* (2013.01); *H04N 5/4401* (2013.01); *H04N 5/783* (2013.01); *H04N 5/781* (2013.01); *G11B 27/005* (2013.01); *H04N 7/17336* (2013.01); *H04N 9/8042* (2013.01); *H04N 21/4325* (2013.01); *H04N 5/85* (2013.01)
USPC ............... 725/90; 725/88; 725/93; 725/102; 386/343; 386/345; 386/346; 386/347; 386/349; 386/350

(58) Field of Classification Search
CPC ............ H04N 21/47202; H04N 5/783; H04N 9/8042; H04N 5/85; H04N 5/4401; H04N 7/17318; H04N 5/781; H04N 7/17336; H04N 21/4325; G11B 27/005
USPC ........ 725/90, 88, 93, 102; 386/343, 345, 346, 386/347, 348, 349, 350
See application file for complete search history.

(56) References Cited

U.S. PATENT DOCUMENTS 5,668,918 A * 9/1997 Augenbraun et al. ........ 386/317
8,208,790 B2 * 6/2012 Toma et al. .................... 386/241
(Continued)

FOREIGN PATENT DOCUMENTS

EP 1297438 A1 11/2001

OTHER PUBLICATIONS

Apple Inc. Technical Note TN2288 found at <http://developerapple.com/library/ios/#technotes/tn2288/_index.html>, pp. 1-19, May 9, 2012.

*Primary Examiner* — Hoang-Vu A Nguyen-Ba
(74) *Attorney, Agent, or Firm* — Lori Anne D. Swanson (57) ABSTRACT

A method of operating an IP client device for presentation of video content to a viewer includes the step of transmitting a trickplay request to a server. The client device receives from the server a manifest that references at least first and second consecutive video content fragments. The first fragment contains a sequence of N1 frames and the second fragment contains a sequence of N2 frames, and defines a set of M1 frames of the first fragment, where M1 is less than N1, and a set of M2 frames of the second fragment, where M2 is less than N2. The client device transmits a request for the M1 frames and the M2 frames and receives the M1 frames and the M2 frames. The client device presents the M1 frames and the M2 frames consecutively at the uniform, predetermined frame rate. The sequence of the M1 frames and the M2 frames has a presentation duration of (M1+M2)/F.

15 Claims, 2 Drawing Sheets

(56) References Cited

U.S. PATENT DOCUMENTS

| | | | |
|---|---|---|---|
| 8,290,338 B2* | 10/2012 | Sasaki et al. | 386/241 |
| 2010/0169303 A1 | 7/2010 | Biderman et al. | |
| 2010/0303444 A1* | 12/2010 | Sasaki et al. | 386/248 |
| 2011/0129198 A1* | 6/2011 | Toma et al. | 386/239 |
| 2011/0219063 A1 | 9/2011 | Park et al. | |
| 2011/0317760 A1 | 12/2011 | Chen et al. | |
| 2012/0189274 A1* | 7/2012 | Toma et al. | 386/241 |

* cited by examiner

METHODS OF IMPLEMENTING TRICKPLAY

BACKGROUND OF THE INVENTION

The subject matter of this application relates to methods of implementing trickplay.

For many years programming viewable on a TV appliance has been broadcast by employing an analog video signal to modulate a radio frequency carrier and propagating the modulated RF carrier over a cable network. The analog video signals for different broadcast TV channels (commonly associated with channel names, such an NBC, CBS and FOX) are impressed on carriers at different frequencies. A receiver in the subscriber premises is tuned to the carrier frequency of the channel that is desired for screening. The receiver may be integrated in the TV appliance or it may be included in a separate device, such as a set-top box (STB).

Television programming and other multimedia content (MM content), including audio, video, graphics, text and data, may also be distributed using digital cable technology. In this case, the content for a given service (corresponding to a channel of the analog broadcast television domain) may be received at the cable network headend in the form of one or more packetized elementary streams that have been encoded in accordance with appropriate compression standards, such as the video compression standard that is commonly referred to as H.264/AVC. The cable network operator may distribute several services by organizing the payloads of the corresponding packetized elementary streams in transport stream packets that are delivered over the cable network physical infrastructure using one or more MPEG-2 systems transport streams. A cable network operator may also distribute digital audio/video (AV) content over the cable network physical infrastructure using internet protocol TV (IPTV).

In an implementation of IPTV, AV content for live TV channels is encoded and encrypted and is made available through an IP server, a delivery network (such as the cable network physical infrastructure or the cellular telephone infrastructure) and a home gateway to an IP client running on a computing device in a TV appliance or an STB.

Digital cable technology facilitates use of trickplay functions in presentation of AV content. A trickplay function allows the AV content to be presented at a different rate and/or in a different direction of evolution from the normal rate and direction of evolution. Thus, whereas AV content is normally presented at a rate corresponding to 30 video frames per second (fps) evolving in a forward direction, trickplay functions permit fast forward presentation at, for example, at a rate corresponding to two or four times (2× or 4×) the normal video frame rate and reverse presentation, i.e. presentation in the opposite direction from normal evolution at, for example, the normal frame rate or a rate corresponding to 2× or 4× times the normal frame rate.

SUMMARY OF THE INVENTION

In accordance with a first aspect of the subject matter disclosed herein there is provided a method of operating an IP client device for presentation of video content to a viewer, wherein in a normal play mode the video content is received from a server in fragments each containing a plurality of video frames and the IP client device presents the video frames at a predetermined, uniform frame rate F frames per second, whereby a fragment containing N frames has a normal presentation duration of N/F seconds, the method comprising receiving a trickplay request, transmitting the trickplay request to a server, receiving a manifest from the server, wherein the manifest references at least first and second consecutive video content fragments, the first fragment contains a sequence of N1 frames, where N1 is an integer greater than one, and the second fragment contains a sequence of N2 frames, where N2 is an integer greater than one, and the manifest defines a set of M1 frames of the first fragment, where M1 is an integer less than N1, and a set of M2 frames of the second fragment, where M2 is an integer less than N2, transmitting a request for said M1 frames and said M2 frames, receiving said M1 frames and said M2 frames, and presenting said M1 frames and said M2 frames consecutively at F frames per second, whereby the sequence of said M1 frames and said M2 frames has a presentation duration of (M1+M2)/F.

In accordance with a second aspect of the subject matter disclosed herein there is provided method of operating an IP client device for presentation of video content to a viewer, wherein in a normal play mode the video content is received from a server in fragments each containing a plurality of video frames and the IP client device presents the video frames at a predetermined, uniform frame rate F frames per second, whereby a fragment containing N frames has a normal presentation duration of N/F seconds, and wherein each fragment contains a plurality of frames, the method comprising receiving a trickplay request, transmitting the trickplay request to a server, receiving a manifest from the server, wherein the manifest references at least first and second consecutive video content fragments, the first fragment contains a sequence of N1 frames, where N1 is an integer greater than one, and the second fragment contains a sequence of N2 frames, where N2 is an integer greater than one, and the manifest repeatedly specifies, R times, a first frame of the first fragment and a subsequent frame of the first fragment, where R is an integer smaller than N1/2 and wherein the first frame is independently decodable, transmitting a request for the specified frames of the first fragment and at least one frame of the second fragment, receiving the requested frames, decoding the received frames, and presenting the decoded frames consecutively in the order specified in the manifest at F frames per second, whereby the decoded first frame and the decoded subsequent frame of the first fragment are presented R times in alternating fashion followed immediately by the decoded said one frame of the second fragment in a duration (2*R+1)/F.

In accordance with a third aspect of the subject matter disclosed herein there is provided a method of operating an IP client device for presentation of video content to a viewer, wherein in a normal play mode the video content is received from a server in a file containing a plurality of video frames and the IP client device presents the video frames at a predetermined, uniform frame rate, the method comprising receiving a trickplay request, transmitting the trickplay request to a server, receiving a manifest from the server, wherein the manifest specifies a block of video content containing a sequence of Q frames, where Q is an integer greater than five, and defines a first set of M1 frames and a second set of M2 frames, where M1 and M2 are integers, (M1+M2) is less than Q, and the set of M2 frames is spaced in the sequence of Q frames from the set of M1 frames by at least one frame, transmitting a request for said M1 frames and said M2 frames, receiving said M1 frames and said M2 frames decoding said M1 frames and said M2 frames, and presenting said M1 frames and said M2 frames consecutively at said uniform, predetermined frame rate.

In accordance with a fourth aspect of the subject matter disclosed herein there is provided a method of operating an IP client device for presentation of video content to a viewer, wherein in a normal play mode the video content is received from a server in a file containing a plurality of video frames and the IP client device presents the video frames at a predetermined, uniform frame rate, the method comprising receiving a trickplay request, transmitting the trickplay request to a server, receiving a manifest from the server, wherein the manifest specifies a block of video content containing a sequence of Q frames, where Q is an integer greater than five, and the manifest repeatedly specifies, R times, a first frame and a subsequent frame, where R is an integer greater than one and wherein the first frame is independently decodable, transmitting a request for the specified frames of the first fragment and at least one frame of the second fragment, receiving the requested frames, decoding the received frames, and presenting the decoded frames consecutively in the order specified in the manifest at F frames per second, whereby the decoded first frame and the decoded subsequent frame are presented R times in alternating fashion in a duration 2*R/F.

The term "consecutive" when used in connection with fragments means that one fragment follows the other fragment without an intervening fragment but does not require a particular order.

BRIEF DESCRIPTION OF THE DRAWINGS

For a better understanding of the subject matter disclosed herein, and to show how the same may be carried into effect, reference will now be made, by way of example, to the accompanying drawings, in which.

DETAILED DESCRIPTION

Some aspects of this description relate to an implementation employing HTTP Live Streaming (HLS) but the subject matter described herein is not restricted to implementations employing HLS.

Using IPTV streaming technology, MM content may be created and published to an IP server and thereby made available within the home or over the internet to IP client devices. The MM content may be what is perceived by the viewer to be live, such as a contemporaneous sporting event, or prerecorded, such as the previous week's episode of a drama series. In the case of live content, a transcoder transcodes the compressed MM content as short chunks (also known as segments), typically having a duration of from 1-10 seconds. At a 30 fps rate, a chunk typically contains data for 30 to 300 video frames. Each chunk (or sequence of chunks) is saved as a file, for example with a name in the form Myrecord_chunki.ts (where i is an index), and the file is saved at a network location defined by an HTTP Uniform Resource Locator (URL) that can be used in an HTTP command to access the chunk. Thus, the file is associated with a unique Uniform Resource Indicator (URI) in the form http://URL/Myrecord_chunk1.ts.

The IP client selects the MM content for presentation based on commands communicated to the client device, for example by a hand-held remote control device. The IP server responds to a play command provided by the IP client by creating a manifest (or playlist) that specifies the URIs of the chunks that form the selected MM content and allows the IP client to access the content using an appropriate HTTP command, such as the Get command.

The client receives the manifest, recovers the URIs for chunk files from the manifest and sends HTTP commands identifying URI to the server. The server responds by retrieving the files containing the requested chunks, encapsulating the files in IP packets, and transmitting the IP packets to the client. It is not necessary that the IP client should retrieve the files one at a time, in response to respective requests, but it may instead send an HTTP command identifying the URIs of several chunks, in which case the server transmits IP packets encapsulating several files containing respective chunks.

The IP client receives the IP packets conveying the AV content and decrypts and decodes the packets to produce an AV signal for presenting the AV content to the viewer.

Prerecorded content is transcoded as chunks and may be recorded as chunks, with each chunk associated with a unique URI, as in the case of live content, but it is also possible to concatenate the chunks and form a single file containing all the frames for an entire program (or a substantial part of the program, for example one or more scenes) and associate the file with one unique URI, e.g. in the form http://URL/Myrecord.ts. Playing of the AV content is similar to the case of live content except that the manifest identifies fewer URIs and the IP client requests fewer files from the server.

It will be appreciated that in the case of typical "live" content the chunks need only be recorded transiently whereas the file or files containing the chunks of prerecorded content may be stored indefinitely for viewing when desired by the customer, whereas in the case of linear television (such as broadcast television), in which the program is made available at a particular time and as a particular service and the viewer decides whether to take it or leave it, the content is concurrently ingested by a transcoder and the content is made available only transiently to the viewer.

In the event that the user selects a trickplay mode of operation, e.g. fast forward, the IP client continues to receive the chunk files, and may continue to decode each frame, but drops some of the frames so that, for example, in the case of 2× fast forward only half of the frames are presented to the viewer. Since the frames are presented at the same rate (30 fps) but half the frames are omitted, the content evolves at twice the normal rate.

Since the client receives all the frames at twice the normal frame rate and processes all the frames, network congestion may impede delivery of the files and limitations on the processing power of the IP client device may limit the ability of the IP client to decrypt and decode the IP packets. In either event, the quality of the trickplay presentation of the AV content may be impaired.

Moreover, this mode of operation requires the IP client to be trickplay-aware, i.e. to function differently in trickplay mode from normal mode.

Modern video compression standards encode video content using intracoded (I) frames, predictively coded (P) frames and bi-directionally predictively coded (B) frames. An I frame can be decoded without information from any other frame whereas a P frame or a B frame cannot be decoded without information from at least one other frame.

In accordance with another approach for implementing trickplay, the client device receives the I, B and P frames but presents only the I frames. In this case, when the client selects the fast forward operation, a request transmitted to the server causes the server to generate an I-frame only manifest in which the byte offset of each I-frame in the file containing the chunk, i.e. the number of bytes from the beginning of the first frame (byte 0) to the beginning of the I-frame, is specified. The client receives the manifest and requests the bytes for the I-frames from the server. In an implementation of I-frame only trickplay the presentation of the video content may be jerky, particularly at higher play out rates.

Figure 1:
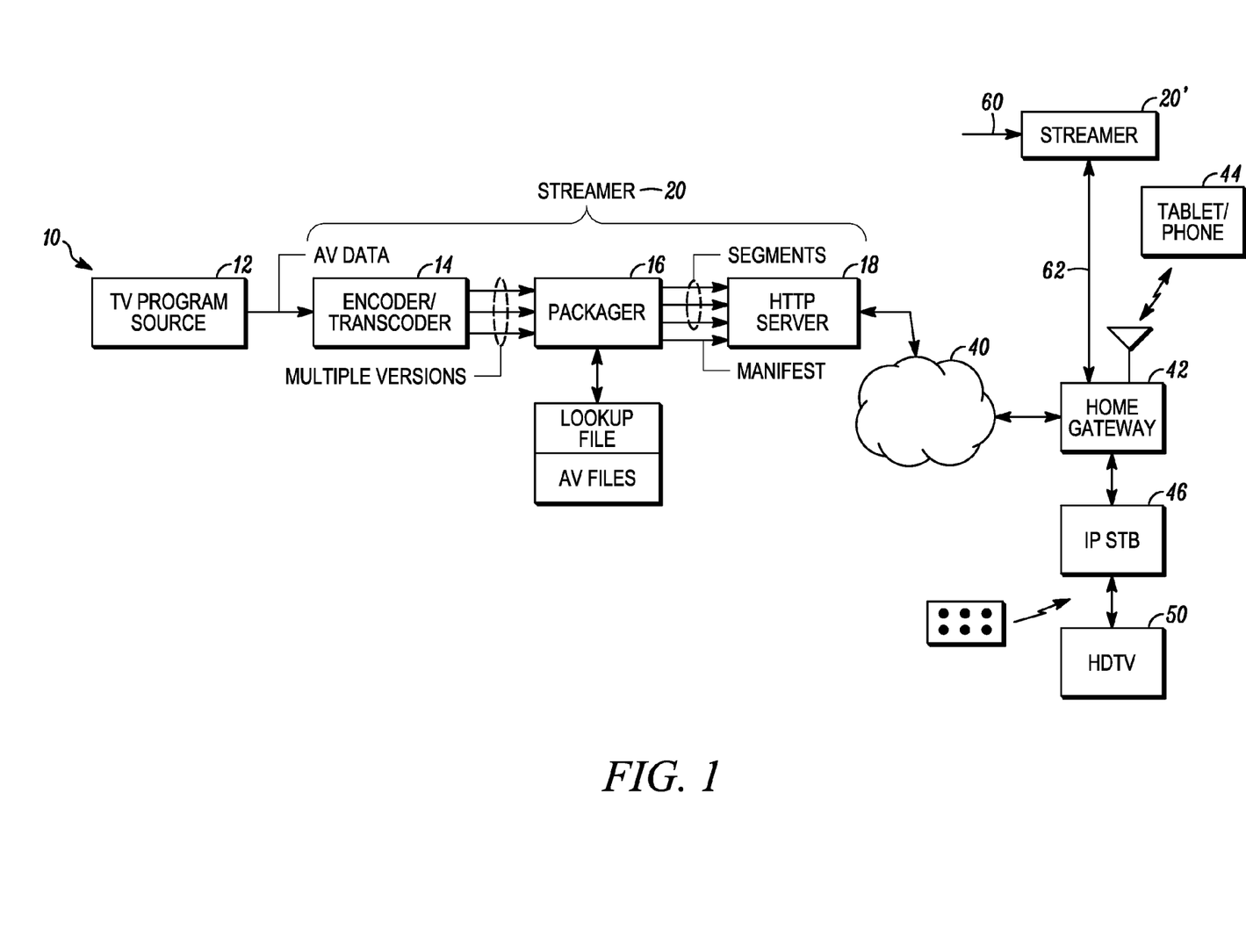
FIG. 1 is a schematic block diagram illustrating how trickplay operation may be applied to delivery of AV content by IPTV.

Referring to FIG. 1, an IPTV streaming appliance 10 includes a TV program source 12 that delivers a signal conveying the AV content for a given service to a streamer 20, the main functional blocks of which are an encoder/transcoder 14, a packager 16 and an HTTP server 18. The transcoder produces at least one, and possibly several, versions of the AV content encoded in accordance with appropriate audio and video compression standards. For each version, the transcoder produces a video elementary stream and a first language audio elementary stream, and may also produce other elementary streams, such as a second language audio stream and a subtitle stream. The several elementary streams are multiplexed together to produce an MPEG-2 single program transport stream. For the purpose of this description, we will assume that the transcoder produces only one version of the AV content.

The transcoder 14 provides the AVC single program transport stream to the packager 16, which slices the AV content into consecutive chunks and supplies the sequence of chunks to the HTTP server 18 as respective AV content files. The HTTP server encapsulates the AV content files in IP packets and makes the IP packets available to the internet 40.

For each chunk, the streamer prepares a lookup file containing the byte offsets of all frames within the chunk, i.e. the number of bytes between the first byte of the first frame (byte 0) of the chunk and the first byte of each other frame of the chunk.

At a customer premises, a home gateway 42 (including a router that is not separately shown) is connected to the internet 40. The home gateway is connected wirelessly to a tablet or phone 44. A wired connection is provided between the home gateway 42 and an STB 46, which is connected to a TV appliance 50.

In order to present the program content provided by the TV program source 12 to a viewer in normal operation, an IP client running on a computing device, such as the STB 46, sends an appropriate HTTP command, such as the HTTP Get command, to the server 18, signifying that the IP client wishes to acquire the AV data for a selected service from the server 18. The streamer creates a manifest that specifies the URIs of the files that contain the data for the selected service and transmits the manifest to the IP client. The IP client running on the STB 46 uses the information in the manifest to request the files and the server transmits IP packets containing the data for the selected service to the client. The IP client decrypts and decodes the IP packets and generates an AV signal which it supplies to the TV applicant to present the AV content to the viewer.

If the IP client receives a command signifying that the viewer has requested 2× fast forward operation, the IP client sends an HTTP command to the streamer signifying that fast forward (FF) operation has been requested. Let us assume that each chunk contains 30 frames. The streamer calculates the number of frames that must be presented during the normal presentation of each chunk in order to provide 2× operation (i.e. 15 frames in the case of a chunk containing 30 frames). The streamer uses the lookup files to determine the byte offset for frame 16 of each chunk and responds to the FF command by creating a new manifest, which it sends to the IP client.

The new manifest may include statements in the following form:

. . . ,
EXTINF:0.5,
EXT-X-BYTERANGE:181420@0
# denotes client to play 181420 bytes from beginning (0) of chunk 1 to play only desired frames (15) from Myrecord_chunk1.ts, it being assumed that the first byte of frame 16 is byte 181421
http://192.168.0.185/Myrecord_chunk1.ts
. . . ,
EXTINF:0.5,
EXT-X-BYTERANGE:180000@0
# denotes client to play 180000 bytes from beginning (0) of chunk 2 to play only desired frames (15) from Myrecord_chunk2.ts, it being assumed that the first byte of frame 16 is byte 180001
http://192.268.0.185/Myrecord_chunk2.ts
EXTINF:05,
. . .

The playlist may include other tags required by the particular streaming standard.

The EXT-X-BYTERANGE tag preceding the URI of each chunk file designates the bytes to be played by the client. As noted in the comments, the designated bytes contain the data for 15 frames. Accordingly, the client presents only 15 frames from each chunk and omits the remaining frames.

The EXT-X-DISCONTINUITY tag could be included between consecutive chunks to indicate an encoding discontinuity between the preceding chunk and the following chunk.

By playing only 15 frames of each chunk, and omitting 15 frames of each chunk, a 2× fast forward trickplay function is provided. A 4× fast forward trickplay function may be provided by using a byte range that specifies only 7 or 8 frames for each chunk.

The form of the playlist ensures that the client is required to process the AV data at only 30 fps. Moreover, the network delivers the data at only 30 fps, limiting the possibility of network congestion. The trickplay functionality is provided by the server and the client need not be trickplay aware beyond simply passing on the trickplay request to the server. Accordingly, as long as the client is able to process the frames provided by the server, it is able to respond appropriately to a trickplay command from the viewer.

In the case of prerecorded content in which the chunk structure has been preserved, the operation is similar to the operation for live content, as discussed above. In the case of prerecorded content in which the chunks have been concatenated to produce a single AV content file, the streamer 20 prepares a lookup file containing byte offsets of all chunks and all frames within each chunk. In this case the manifest may include statements in the following form:

. . . ,
EXTINF:0.5,
EXT-X-BYTERANGE:181420@0
# denotes client to play 181420 bytes from the beginning (0) of the concatenated file to play only desired frames (15)
http://192.168.0.185/Myrecord1.ts
. . . ,
EXTINF:0.5,
EXT-X-BYTERANGE: 171234@361234
# denotes a jump to desired frames of next chunk within the concatenated AV content file to play only desired frames (15)
http://192.168.0.185/Myrecord1.ts
. . . ,
EXTINF:0.5,
EXT-X-BYTERANGE: 170234@684240
# denotes a jump to desired frames of next chunk within the concatenated AV content file to play only desired frames (15)
http://192.168.0.185/Myrecord1.ts
. . .

Reverse play is similar to forward play. The streamer calculates the number of frames to be presented from each chunk in order to achieve the desired rate of presentation of the content and uses the byte offsets to select the frames to be displayed but traverses the chunks in the reverse direction:

```
...,
   #EXTINF:0.5,
   #EXT-X-BYTERANGE:180000@0
# denotes client to play 180000 bytes from beginning of
chunk 2 (byte 0) to play only desired frames (15) from
Myrecord_chunk2.ts
   http://192.268.0.185/Myrecord_chunk2.ts
   ...,
   #EXTINF:0.5,
   #EXT-X-BYTERANGE:181420@0
# denotes client to play 181420 bytes from beginning of
chunk 1 to play only desired frames (15) from
Myrecord_chunk1.ts
   http://192.168.0.185/Myrecord_chunk1.ts
   ...
```

In accordance with another approach, the streamer 20 prepares a lookup file that contains the byte offsets for each chunk for each I-frame in each chunk, and for each P-frame or B-frame immediately following the I-frame. The streamer calculates the necessary presentation duration of each pair of frames in a chunk beneath the desired trickplay speed. For example, at 2× speed a chunk containing 60 frames should occupy one second, and if the chunk contained three I-frames the first I-frame and the immediate following P or B frame should be presented for 5/30 seconds. The byte range tag denotes the byte offsets for each I-frame and the next following dependent frame (P or B).

It will be appreciated that in order to be certain of being able to decode the P-frame the I-frame must be an IDR-frame. However, it will also be understood by those skilled in the art that relevant standards require that the first frame of each chunk be an IDR-frame.

In the event that the immediate following frame is dependent on a future frame, the streamer will include that frame too while signaling and will suitably adjust the frame count to match the play out duration of the requested trickplay. Suppose, for example, that each fragment starts with an I-frame and has a duration of one second. In order to achieve 2× speed for a 30 fps video, the first two frames of each fragment are repeated seven times, for a total of 14 times the frame duration. However, for proper timing we have to display 15 frames (not 14). This may be accomplished by displaying the I/P pair of the fragment seven times (14 frames) followed by the P frame of the same fragment at the end (total 15 frames). For 3× speed, we repeat the first two frames of each fragment five times (two frames five times equals ten frames).

In the case of content recorded in separate chunks, the manifest specifies multiple chunks over which the trickplay evolves and the byte range offsets of the desired frames in each chunk; in the case of content recorded as a single file, covering multiple chunks, the manifest specifies the byte range offsets of the desired frames relative to the beginning of the file. The manifest repeats the byte range the appropriate number of times to achieve the desired play out duration. The following is an example of a portion of a manifest for an HLS implementation:

```
   ...,
   #EXTINF:0.066,
# I followed by a P/B frame
   #EXT-X-BYTERANGE:3200@526
# I followed by a P/B frame
   http://URL/t0.ts
   #EXTINF: 0.066,
# repeat above I followed by a P/B frame till we reach needed
time duration
   #EXT-X-BYTERANGE:3200@526
# I followed by a P/B frame
   http://URL/t0.ts
   ...
```

This mode of operation is advantageous because it is not necessary to save the locations of all the frames in the database but only the locations of the I-frames and the immediately following P/B frames, so memory usage is reduced and performance is optimized.

By repeating each pair of frames a sufficient number of times, a slow forward mode of operation may be provided.

The IP client may run not only on an STB, as discussed, but also on a tablet or phone that is connected to the internet, either through a home gateway, as described in connection with FIG. 1, or through other network infrastructure such as the cellular telephone network infrastructure.

The foregoing discussion is based on the possibility of the streamer 20 being remote from the home and the content being supplied from the streamer to the home gateway over the internet 40. In a another implementation, the streamer may be located in the home and connected to receive content delivered over the cable TV distribution network. Thus, a streamer 20', which is connected to the home gateway over a home network 62, may receive content from a cable system headend (not shown) over a coaxial cable 60. The streamer 20' performs the functions attributed to the streamer 20 in the foregoing discussion and interacts with the STB 46 in the same manner as the streamer 20.

Figure 2:
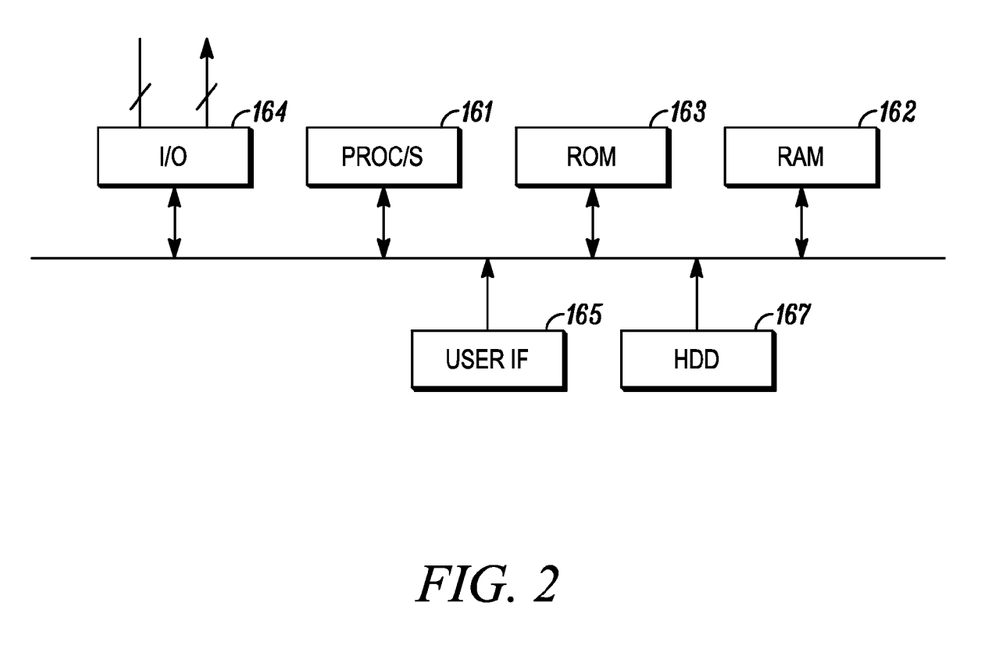
FIG. 2 is a schematic block diagram of a computing device that may be used to implement the methods described with reference to FIG. 1.

Referring to FIG. 2, one or more of the functional blocks shown in FIG. 1 for receiving the IP packets from the home gateway 42 and producing the signal for driving the TV appliance 50 may be implemented by a computing device comprising at least one processor 161, random access memory 162, read only memory 163, I/O devices 164 (including suitable adaptors for receiving and transmitting bitstreams), a user interface 165, a hard disk drive 167 and one or more buses, configured in a generally conventional architecture. The computing device operates in accordance with a program that is stored in a non-transitory computer readable memory, such as the hard disk drive 167, and is loaded into the random access memory 162 for execution. The program is composed of instructions such that when the computing device receives a signal representing the input of the STB 46, by way of a suitable interface included in the I/O devices, the computing device allocates memory to appropriate buffers and utilizes other suitable resources and functions to perform the various operations that are described above as being performed by the functional blocks of the STB.

In a modification of the I-frame only operation, when there is no assurance that the frame immediately following the I-frame is independently decodable, the manifest may reference the first I-frame and the necessary number of frames to be sure that the client is able to decode the frame that immediately follows the I-frame. In this case the client may present more than two frames and adjust R accordingly. Alternatively, the client may be instructed to present only two frames, but in this case the client would have to have additional functionality.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method of operating an IP client device for presentation of video content to a viewer, wherein in a normal play mode the video content is received from a server in fragments each containing a plurality of video frames and the IP client device presents the video frames at a predetermined, uniform frame rate F frames per second, whereby a fragment containing N frames has a normal presentation duration of N/F seconds, the method comprising:
receiving a trickplay request,
transmitting the trickplay request to a server,
receiving a manifest from the server, wherein the manifest references at least first and second consecutive video content fragments, the first fragment contains a sequence of N1 frames, where N1 is an integer greater than one, and the second fragment contains a sequence of N2 frames, where N2 is an integer greater than one, and the manifest defines a set of M1 frames of the first fragment, where M1 is an integer less than N1, and a set of M2 frames of the second fragment, where M2 is an integer less than N2,
transmitting a request for said M1 frames and said M2 frames,
receiving said M1 frames and said M2 frames, and
presenting said M1 frames and said M2 frames consecutively at F frames per second,
whereby the sequence of said M1 frames and said M2 frames has a presentation duration of (M1+M2)/F.

2. A method according to claim 1, when the first and second video content fragments are respective files having unique universal resource indicators and the step of transmitting the request for said M1 frames and said M2 frames comprises transmitting a request that identifies the universal resource indicators for the first and second video content fragments and defines a range of bytes containing the set of M1 frames exclusively and a range of bytes containing the set of M2 frames exclusively.

3. A method according to claim 1, comprising presenting said M1 frames prior to presenting said M2 frames.

4. A method according to claim 1, comprising presenting said M2 frames prior to presenting said M1 frames.

5. A method of operating an IP client device for presentation of video content to a viewer, wherein in a normal play mode the video content is received from a server in fragments each containing a plurality of video frames and the IP client device presents the video frames at a predetermined, uniform frame rate F frames per second, whereby a fragment containing N frames has a normal presentation duration of N/F seconds, and wherein each fragment contains a plurality of frames, the method comprising:
receiving a trickplay request,
transmitting the trickplay request to a server,
receiving a manifest from the server, wherein the manifest references at least first and second consecutive video content fragments, the first fragment contains a sequence of N1 frames, where N1 is an integer greater than one, and the second fragment contains a sequence of N2 frames, where N2 is an integer greater than one, and the manifest repeatedly specifies, R times, a first frame of the first fragment and a subsequent frame of the first fragment, where R is an integer smaller than N1/2 and wherein the first frame is independently decodable,
transmitting a request for the specified frames of the first fragment and at least one frame of the second fragment,
receiving the requested frames,
decoding the received frames, and
presenting the decoded frames consecutively in the order specified in the manifest at F frames per second,
whereby the decoded first frame and the decoded subsequent frame of the first fragment are presented R times in alternating fashion followed immediately by the decoded said one frame of the second fragment in a duration (2*R+1)/F.

6. A method according to claim 5, wherein said first frame is an I-frame and said specified subsequent frame is a P-frame or a B-frame.

7. A method according to claim 5, wherein said first frame is an I-frame and said specified subsequent frame is a P-slice frame or a B-slice frame.

8. A method according to claim 5, wherein the specified subsequent frame is decodable independently of any other subsequent frame.

9. A method according to claim 5, the specified subsequent frame is dependent on at least one other subsequent frame, the manifest repeatedly specifies said first frame of the first fragment, said specified subsequent frame, and each other subsequent frame on which said specified subsequent frame is dependent.

10. A method of operating an IP client device for presentation of video content to a viewer, wherein in a normal play mode the video content is received from a server in a file containing a plurality of video frames and the IP client device presents the video frames at a predetermined, uniform frame rate, the method comprising:
receiving a trickplay request,
transmitting the trickplay request to a server,
receiving a manifest from the server, wherein the manifest specifies a block of video content containing a sequence of Q frames, where Q is an integer greater than five, and defines a first set of M1 frames and a second set of M2 frames, where M1 and M2 are integers, (M1+M2) is less than Q, and the set of M2 frames is spaced in the sequence of Q frames from the set of M1 frames by at least one frame,
transmitting a request for said M1 frames and said M2 frames,
receiving said M1 frames and said M2 frames,
decoding said M1 frames and said M2 frames, and
presenting said M1 frames and said M2 frames consecutively at said uniform, predetermined frame rate.

11. A method of operating an IP client device for presentation of video content to a viewer, wherein in a normal play mode the video content is received from a server in a file containing a plurality of video frames and the IP client device presents the video frames at a predetermined, uniform frame rate, the method comprising:
receiving a trickplay request,
transmitting the trickplay request to a server,
receiving a manifest from the server, wherein the manifest specifies a block of video content containing a sequence of Q frames, where Q is an integer greater than five, and the manifest repeatedly specifies, R times, a first frame and a subsequent frame, where R is an integer greater than one and wherein the first frame is independently decodable, transmitting a request for the specified frames of a first fragment and at least one frame of a second fragment, receiving the requested frames, decoding the received frames, and presenting the decoded frames consecutively in the order specified in the manifest at F frames per second, whereby the decoded first frame and the decoded subsequent frame are presented R times in alternating fashion in a duration 2*R/F.

12. A method according to claim 11, wherein said first frame is an I-frame and said specified subsequent frame is a P-frame or a B-frame.

13. A method according to claim 11, wherein said first frame is an I-frame and said specified subsequent frame is a P-slice frame or a B-slice frame.

14. A method according to claim 11, wherein the specified subsequent frame is decodable independently of any other subsequent frame.

15. A method according to claim 11, the specified subsequent frame is dependent on at least one other subsequent frame, the manifest repeatedly specifies said first frame of the first fragment, said specified subsequent frame, and each other subsequent frame on which said specified subsequent frame is dependent.

* * * * *

UNITED STATES PATENT AND TRADEMARK OFFICE
CERTIFICATE OF CORRECTION

| | |
|---|---|
| PATENT NO. | : 8,826,346 B1 |
| APPLICATION NO. | : 13/832191 |
| DATED | : September 2, 2014 |
| INVENTOR(S) | : Krishna Prasad Panje, William P. Franks and Murali Sahasranaman |

It is certified that error appears in the above-identified patent and that said Letters Patent is hereby corrected as shown below:

Title Page

Page 1 of the Letters Patent in Item (72) Inventors; whereas the first inventor's name is missing letter 'r', shown incorrectly as 'Kishna'. The first inventor's name should include the letter 'r' to be shown correctly as 'Krishna'.

Signed and Sealed this
Twenty-seventh Day of October, 2015

Michelle K. Lee
*Director of the United States Patent and Trademark Office*